United States Patent [19]

Evani

[11] Patent Number: 4,933,405
[45] Date of Patent: Jun. 12, 1990

[54] HOMOGENEOUS COPOLYMERIZATION OF NON-POLAR MONOMERS WITH IONIC AMPHIPHILIC MONOMERS

[75] Inventor: Syamalarao Evani, Midland, Mich.

[73] Assignee: The Dow Chemical Company, Midland, Mich.

[21] Appl. No.: 872,782

[22] Filed: Jun. 10, 1986

[51] Int. Cl.$^5$ .................. C08F 30/04; C08F 26/06
[52] U.S. Cl. .................. 526/240; 526/262; 526/265; 526/287; 526/288; 526/259
[58] Field of Search .............. 526/240, 265, 287, 288, 526/262, 259

[56] References Cited

U.S. PATENT DOCUMENTS

| 2,837,500 | 6/1958 | Andres et al. . | |
|---|---|---|---|
| 2,900,370 | 8/1959 | Wilkinson . | |
| 3,248,457 | 8/1966 | D'Allelo . | |
| 3,264,272 | 8/1966 | Rees . | |
| 3,379,702 | 4/1968 | Spivey . | |
| 3,404,134 | 10/1968 | Rees . | |
| 3,657,201 | 4/1972 | Takeya et al. . | |
| 3,700,647 | 10/1972 | Nakaguchi et al. . | |
| 3,836,511 | 9/1974 | O'Farrell et al. . | |
| 3,937,764 | 2/1976 | Horikawa et al. | 526/265 |
| 4,014,847 | 3/1977 | Lundberg et al. . | |
| 4,205,152 | 5/1980 | Mizugrichi et al. | 526/265 |

OTHER PUBLICATIONS

K. Nagai, Yamogata Univ. Kobunshi, 1984, 33(9), 686-9, Japan Chem. Abstracts vol. 75, entry 63310k.

*Primary Examiner*—Joseph L. Schofer
*Assistant Examiner*—Peter F. Kulkosky

[57] ABSTRACT

Ionic copolymers exhibiting uniform, gel-free solution viscosity aned a controllable melt viscosity and hot melt tension are prepared by copolymerizing in an oil phase a nonionic monomer such as styrene or an alkylacrylate with an ionic monomer such as zinc dodecyl maleate or didodecyldimethylammonium p-styrene sulfonate.

11 Claims, No Drawings

HOMOGENEOUS COPOLYMERIZATION OF NON-POLAR MONOMERS WITH IONIC AMPHIPHILIC MONOMERS

BACKGROUND OF THE INVENTION

This invention relates to ionic polymers, and to methods for the preparation thereof.

Certain ionic polymers, often called ionomers, are well-known as thermoplastic materials which, because of their toughness and adhesive character, are useful as coatings for a wide variety of substrates and as molded materials such as golf balls. Such ionomers are described in U.S. Pat. Nos. 3,264,272; 3,404,134; 3,657,201; and 3,836,511.

These ionic polymers, while generally thermoplastic and often soluble in organic solvents, exhibit characteristics similar to those of cross-linked polymers at normal temperatures. At elevated temperatures, they are readily extruded or molded in the same manner as thermoplastic polymers. These ionic polymers are believed to exhibit cross-linked characteristics as a result of ionic bonding between molecules of the polymer. Usually such bonding exists as a result of ionic attraction between anionic carboxylate, sulfonate or phosphonate moieties covalently bonded to the polymer molecules and metal cations characteristic of salt moieties.

Such ionic polymers are conventionally prepared by first copolymerizing small quantities of vinyl acid comonomers with major amounts of non-polar vinyl monomers such as ethylene or styrene. The resulting acid copolymers are then neutralized with bases in order to incorporate the desired cation into the polymer and to provide the desired ionic cross-linking. Alternatively, the ionic polymers are prepared by a post-reaction process wherein the preformed polymer dissolved in an organic solvent is first reacted with sulfonating agents such as sulfur trioxide, acetyl sulfate or other reagents to introduce sulfonic acid groups onto the polymer backbone, and then neutralized with base to form the desired ionic cross-linkages. Unfortunately, both processes are multi-step, expensive, involve the use of highly corrosive acidic reagents and/or are very time consuming. Moreover, in the post-neutralization step which involves mixing the sulfonated polymer with more polar neutralizing agents in a mechanical device, the viscosity of the mixing increases considerably and thus results in a certain amount of polymer molecular weight degradation and non-uniform neutralization.

Attempts to overcome these deficiencies by direct copolymerization of non-polar monomers with ionic comonomers have not been totally successful. Usually such processes involve the use of expensive polar solvents or cosolvents for the non-polar monomer and ionic comonomer which must be recovered from the resulting polymer. Such solvents often cause chain-transfer reactions during polymerization resulting in lower molecular weight polymers.

Preparation of ionic copolymers via aqueous emulsion polymerization methods involves the use of water-soluble surfactants which have to be removed from the resulting ionic copolymers. Moreover, as a result of different solubilities of the non-polar monomer and ionic monomer in the aqueous phase of the emulsion, the incorporation of the ionic monomer into the ionic copolymer is non-uniform thereby producing a heterogeneous product instead of the desired homogeneous ionic polymer.

Thus, a single step, inexpensive process for making ionic polymers exhibiting the desirable properties of conventional ionomers including the physical properties of the most desirable high molecular weight, homogenous ionomers is needed.

SUMMARY OF THE INVENTION

In one aspect, the present invention is such a process which comprises contacting at least one nonionic, ethylenically unsaturated monomer with at least one ionic, ethylenically unsaturated monomer which is soluble in a non-polar, organic liquid in the presence of an effective amount of an initiator under conditions sufficient to cause copolymerization of said monomers in oil phase thereby forming an ionic copolymer having (1) an essentially uniform distribution of ionic mers in the molecules of the copolymer and (2) an average molecular weight sufficient to enable the copolymer to be processable under conventional processing conditions.

In another aspect, this invention is an ionic copolymer of at least one nonionic ethylenically unsaturated monomer and at least one ionic, ethylenically unsaturated amphiphilic monomer having (1) essentially uniform distribution of an ionic amphiphilic monomer in the molecules of copolymer and (2) a number average molecular weight ($M_n$) greater than 250.

Surprisingly, the novel ionic copolymers of this invention exhibit uniform gel-free solution viscosity properties as well as controllable melt viscosity and hot melt tension properties which are superior to conventional ionic copolymer properties.

The ionic copolymers of this invention are useful for making plastic foams, films, fibers, plastic panels, thermoplastic elastomers, polymer alloys, ionic impact polymers, thermoplastic adhesives, pressure sensitive adhesives, molded articles, coatings, non-aqueous media suspension aids, viscosifiers for non-aqueous media, drag-reducing aids for non-aqueous media, antimist control agents in cutting oils, viscosifiers and rheology control aids for paints, jet fuels, oil-based fracturing fluids and drilling fluids, asphalt, stabilizers for aqueous suspensions in non-aqueous media, ion selective membrane coatings or films, and gas separation membranes.

DETAILED DESCRIPTION OF ILLUSTRATIVE EMBODIMENTS

The nonionic monomers employed in the practice of this invention (1) are preferably addition polymerizable, ethylenically unsaturated non-polar compounds, (2) are water-insoluble and (3) have solubility parameters determined by the method of Hildebrand and Scott in *The Solubility of Non-Electrolytes*, 3rd ed., Rheinhold, pp. 129, 301 (1949), which are less than 15, more preferably less than 12, most preferably from about 6 to about 12. Exemplary nonionic monomers include α-olefins such as ethylene, propylene, 1-butene and other polymerizable olefins; vinyl aromatic monomers such as styrene, vinyl naphthalene, vinyl anthracene as well as halo-, alkyl-, aryl-, arylalkyl-, cyano- and nitro-substituted derivatives thereof such as ar-t-butylstyrene, ar-chlorostyrene, ar-methylstyrene, α-methylstyrene; alkyl and aryl esters of α,β-ethylenically unsaturated carboxylic acids such as ethyl acrylate, methyl methacrylate, butyl acrylate, 2-ethylhexyl acrylate, phenyl acrylate and other alkyl, aryl and alkylaryl esters of such acids; dienes such as 1,3-butadiene, isoprene, norbornene and 1,5-hexadiene; as ethylenically unsaturated esters of saturated carboxylic acids such as vinyl acetate and vinyl propionate; an ethylenically unsaturated halide such as vinyl chloride, vinyl bromine, vinyl fluoride, vinylidene fluoride and vinylidene chloride; unsaturated ethers and ketones such as vinyl methyl ketone, vinyl methyl ether and vinyl ethyl ether; mono- and dialkyl esters, alkylaryl esters and mono- and diaryl esters of $\alpha,\beta$-ethylenically unsaturated dicarboxylic anhydrides such as diethyl maleate and diphenyl maleate; and the like. Of the foregoing monomers, $\alpha$-olefins, vinyl aromatics, alkyl esters of acrylic and methacrylic acid are preferred, with ethylene, propylene, styrene and substituted styrenes being more preferred and styrene being most preferred.

The nonionic monomer or mixture of two or more of such monomers is present in combination with the ionic copolymers of this invention in an amount sufficient to provide the desired mechanical properties, e.g., tensile strength, flexural strength and impact strength, at temperatures below the glass transition temperature of the polymer. Preferably, the amount of nonionic monomer(s) is present in an amount in the range from about 50 to about 99.99, more preferably from about 90 to about 99.9, most preferably from about 95 to about 99.9 mole percent.

Ionic monomers usefully employed in the practice of this invention are amphiphilic, ethylenically unsaturated monomers having a polymerizable vinyl moiety covalently bonded to (1) at least one ionic salt moiety and (2) at least one hydrophobic moiety which renders the monomer apparently soluble in an organic liquid such as aromatic hydrocarbons, aliphatic hydrocarbons or the non-polar monomers as defined hereinbefore. By "apparently soluble" it is meant that the ionic monomer when dispersed in the organic liquid gives a lyophilic dispersion as defined in *Principles of Colloid and Surface Chemistry*, p. 8 (1977) by P. C. Hiemenz. By "amphiphilic" it is meant that the ionic monomer has both non-polar functionality, i.e., hydrocarbon, and polar functionality, i.e., ionic salt.

The ionic moieties of the ionic monomer can be (1) cationic such as quaternary ammonium or phosphonium or ternary sulfonium or (2) anionic such as carboxylate, sulfonate, phosphonate or sulfate. The counterionic moieties are suitably anionic such as halide, sulfonate, sulfate, carboxylate or phosphonate or cationic such as quaternary onium or mono-, di- or trivalent inorganic metal cation. In other words, the ionic moiety in the ionic monomer is an ionic salt function comprising a covalently bound cation and/or anion with a suitable counterion. It is also suitable that both anionic and cationic moieties be chemically bonded to the same amphiphilic monomer molecule.

Preferred hydrophobic moieties include alkyl or alkylaryl wherein alkyl has from 6 to 18 carbons, especially hexyl, 2-ethylhexyl, decyl, dodecyl, octadecyl, dodecylphenyl and the like.

The ionic monomer is preferably one represented by the formulae:

[V(Y⊕)][(⊖X)R], [(Y⊕)][(⊖X)RR¹V],

[R(Y⊕)][(⊖X)R¹V], [VR(Y⊕)][(⊖X)R¹],

[VRR¹(Y⊕)(⊖X)], [V(Y⊕)][(⊖X)RR¹V¹],

[V(Y⊕)][(⊖X)RR¹], [VR(Y⊕)][(⊖X)R¹V¹]

wherein V and V¹ are polymerizable vinyl moieties of the same type or different types; R and R¹ are the same or different hydrophobic moieties such as defined hereinbefore, (Y⊕) is the cationic moiety of the ionic salt function, (⊖X) is the anionic moiety of the ionic salt function and the moieties within each set of brackets [] are covalently bound.

More preferred ionic monomers in the practice of this invention are those represented by the following formulae:

[VR(Y⊕)][(⊖X)], [R(Y⊕)][(⊖X)V],

[V(Y⊕)][(⊖X)RV¹], [RR¹(Y⊕)][(⊖X)V],

[VRR¹(Y⊕)][(⊖X)V¹], [VRR¹(Y⊕)][(⊖X)]

wherein V, V¹, R, R¹, (Y⊕) and (⊖X) are as defined hereinbefore.

Most preferred ionic monomers in the practice of this invention are those represented by the following formulae:

[VR(Y⊕)][(⊖X)V¹], [VR(Y⊕)(⊖X)],
[(Y⊕)][(⊖X)RV]

wherein V, V¹, R, (Y⊕) and (⊖X) are as defined hereinbefore.

The foregoing formulae should be interpreted to include the bracketed moieties in any particular configuration. For example, the formula [VR(Y⊕)] includes a cationically charged molecule wherein the vinyl moiety V is covalently bonded to the hydrophobic moiety R which is covalently bound to (Y⊕), i.e., V-R-(Y⊕), as well as cationically charged molecules having the following bonding arrangements: V-(Y⊕)-R and R-V-(Y⊕).

Similarly, the formula, [(⊖X)R¹V¹], includes anionically charged molecules having the following bonding arrangements: (⊖X)-R¹-V¹, R¹-(⊖X)-V¹ and (⊖X)-V¹-R¹. It is further understood that the bracketed moieties which are covalently bound may be, in part or completely, bonded in a heterocycle.

In the aforementioned formulae for the ionic monomers, V and V¹ are preferably vinyl ($H_2C\!=\!CH\!-\!$), vinylbenzyl ($H_2C\!=\!CHC_6H_4CH_2\!-\!$), vinylidene

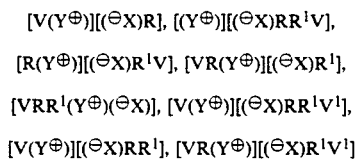

acrylyl

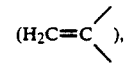

methacrylyl

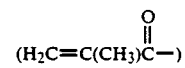

and similar ethylenically unsaturated moieties. The hydrophobic moieties, R and R¹, are preferably hydrocarbon or predominately hydrocarbon moieties having a degree of hydrophobicity at least as much as hexyl and more preferably at least as much as octyl, most preferably at least as much as decyl, e.g., alkyl having from 6 to 20 carbons; alkylaryl wherein alkyl has from 4 to 20 carbons such as nonylphenyl and dodecylphenyl; alkoxy having from 6 to 20 carbons; haloalkyl having from 6 to 20 carbons such as chlorooctyl and the like. The cationic moiety $Y^\oplus$, is preferably onium or a monomer polyvalent inorganic metal cation, e.g., imidazolinium, ammonium including quaternary ammonium, pyridinium, phosphonium, and sulfonium as well as inorganic metal cations such as Li, Na, K, Ba, Ca, Mg, Zn, Pb, Zr, Al, Fe, Cu, Ni, Co and the like. The anionic moiety, $\ominus X$, is preferably carboxylate, sulfonate or phosphonate as well as phosphate or sulfate or halide.

The most preferred ionic monomers are neutral salts having as the anionic moiety an alkyl-substituted ethylenically unsaturated carboxylic acid, sulfonic acids or phosphonic acids and as the cationic moiety, an inorganic metal cation such as Na, Ca, Ba, Zn, Pb. Examples of such neutral ionic monomer salts include zinc salt of dodecyl itaconate, zinc salt of 2-ethylhexyl fumarate.

Ionic monomers which are also most preferred include neutral ionic monomer salts having as cations, ethylenically unsaturated quaternary ammonium or phosphonium compounds having long alkyl chains and ethylenically unsaturated anions. An example of such a monomer is dimethyl dodecyl vinylbenzyl quaternary ammonium styrene sulfonate. Also most preferred are ionic monomers wherein both the cationic and anionic moieties are chemically bonded in the same molecule such as the amphoteric monomer 1-hydroxyethyl-2-undecyl-3-[3-methacryloxy-2-hydroxylpropyl]imidazolinium hydroxide, inner salt.

The ionic monomer(s) are present in the ionic polymer in an amount sufficient to provide a degree of ionic cross-linking which increases the tensile strength of the polymer at temperatures above the glass transition temperature of the polymer. Preferably, the amount of ionic monomer(s) is from about 0.05 to about 50, more preferably from about 0.1 to about 10, most preferably from about 0.1 to about 5 mole percent of the ionic polymer with the remainder being a copolymerized non-polar monomer or a mixture of two or more non-polar monomers.

In the practice of the process of this invention, the non-polar monomer(s) and the ionic monomer(s) are contacted in the presence of an amount of an initiator in a liquid organic medium under conditions effective to copolymerize the non-polar monomer(s) and ionic monomer(s) thereby forming the desired ionic polymer. The copolymerization can be carried out (1) neat, i.e., wherein the non-polar monomer(s) forms the liquid organic medium, or (2) in an inert liquid organic diluent which is a solvent for the non-polar monomer(s). In both instances, the ionic monomer(s) are or appear to be soluble in the liquid organic medium at concentrations sufficient to provide the desired level of copolymerized ionic monomer in the ionic polymer. Preferably, the ionic monomer(s) are soluble in the organic medium at concentrations of at least about 0.01, more preferably at least about 0.1, most preferably at least about 1 weight percent based on the medium.

The initiator employed is any copolymerization catalyst, promoter or initiator which facilitates and/or accelerates copolymerization of the non-polar monomer(s) and the ionic monomer(s). Advantageously, such initiators are (1) free-radical generating initiators including conventional oil-soluble or polar-soluble free-radical catalysts, ultraviolet such as gamma radiation and any combination thereof, (2) anionic or cationic initiators, and (3) redox-type catalysts. Such initiators are used in amounts employed in conventional polymerization techniques. Preferably, the initiator is a free-radical generating catalyst such as azo catalysts, e.g., azobisisobutyronitrile; organic peroxides, e.g., benzoyl peroxide, t-butyl hydroperoxide, lauroyl peroxide, dicumyl peroxide, di-t-butyl peroxide; or other peroxy or hydroperoxy compounds. Such preferred free-radical generating catalysts are preferably employed in amounts in the range from about 0.001 to about 2, most preferably from about 0.01 to about 1, weight percent based on the total monomers. The type and amount of catalyst used will depend upon the temperature of polymerization, the required molecular weight of the resulting copolymer and the control of the rates of polymerization.

In addition to the aforementioned ingredients, the copolymerization mixture may also contain other additives such as plasticizers, dyes, colorants, pigments, antioxidants, and chain-transfer agents. Examples of plasticizers that are particularly useful for facilitating processing and fabricating of the resulting ionic copolymers include alkyl or alkylaryl esters of dicarboxylic acids, their half esters and the corresponding metal salts, metal salts of fatty acid amides. Plasticizers that are ionic or polar in character are preferably used. The use of such plasticizers is known in the field of ionomers. Some examples of such plasticizers are zinc stearate, calcium stearate, zinc salt of 2-ethylhexanoic acid and the like. Of these plasticizers, zinc salts of 2-ethylhexanoic acid and stearic acid as well as metal salts of higher alkyl half esters of phthalic acid are especially preferred. When used, such plasticizers are employed in amounts sufficient to decrease the melt flow viscosity of the copolymer at a given temperature. Preferably an amount from about 0.1 to about 4, more preferably from about 0.5 to about 2 mole equivalents of plasticizer based on the ionic monomer is used.

In carrying out the copolymerization, it is desirable to add the ionic monomer to the non-polar monomer(s) or a solution of the non-polar monomer(s) in an inert organic diluent such as toluene, xylene, heptane, hexane or other hydrocarbon liquid. Other suitable inert diluents include ethylbenzene, methylethyl ketone, tetrahydrofuran, dioxane, ethylacetate, methylene chloride, 1,1,1-trichloroethane. When used, the inert diluent is employed in an amount sufficient to maintain the copolymerization mixture in a liquid state and to control the molecular weight of the resulting copolymer. Preferably, the diluent is used in an amount from about 0 to about 100 weight percent based on total monomers.

Preferably, an organic solution of initiator is added to the resulting solution of monomers and the reaction mixture is heated with agitation under an inert atmosphere such as nitrogen or argon to a temperature effective to initiate copolymerization. While such temperatures vary with the particular initiator being employed, such temperatures are preferably in the range from about 20° C. to about 180° C., most preferably from about 80° C. to about 150° C.

Following copolymerization, the resulting ionic copolymer is recovered by conventional means such as subjecting to heat and/or reduced pressure to remove unreacted monomers and inert diluent if such was employed. The ionic copolymer is thus in condition suitable for extrusion, molding or otherwise fabricating by using methods conventionally employed in fabrication of conventional thermoplastic polymers. This is in contrast to the more difficult fabricating conditions required for processing conventional ionomers.

The ionic copolymers of the present invention have sufficient molecular weight to be moldable into solid parts having physical properties at least equivalent to conventional ionomers. Preferred ionic copolymers have weight average molecular weights as determined by intrinsic viscosity methods in the range from about 50,000 to about 400,000, most preferably from about 100,000 to about 300,000. The more preferred ionic copolymers differ structurally from conventional ionic polymers (ionomers) in that the ionic copolymers of this invention have a hydrophobic moiety covalently bonded to the ionic moiety which is covalently bound to the copolymer backbone. Thus, the ionic copolymers of this invention exhibit uniform solution and physical properties and excellent reproducibility and control of the compositions that are not easily obtained in conventional ionomers.

The ionic copolymers of this invention are useful as thermoplastic ionic polymers for making low, medium and high density foams, foam sheets and resilient foams for thermal insulation, cushioning, packaging and articles derived therefrom. Such thermoplastic ionic copolymers can also be used for making oriented films having excellent toughness and for making panels. Thermoplastic elastomers based on ionic copolymers made from non-polar monomers such as alkyl acrylates are useful as pressure sensitive adhesives, weather resistant caulking compositions, coatings and the like. The ionic copolymers are also useful (1) as thickeners for non-polar fluids and as antimisting additives in lubrication oils, (2) as stabilizers for water-in-oil emulsions and suspensions, (3) as reactive emulsifiers for aqueous polymer latexes and (4) as ion-exchange polymer resins, films and membranes, including membranes for gas separation.

The following examples are given to illustrate the invention and should not be construed as limiting its scope. Unless otherwise indicated, all parts and percentages are by weight.

EXAMPLE 1

A. Preparation of Vinylbenzyl(dimethyl)(octadecyl)ammonium p-Styrene Sulfonate

A 30-g solution (0.1 mole) of octadecyldimethylamine is mixed with 14.25 g (0.1 mole) of vinylbenzyl chloride in a flask and stirred at room temperature to get a uniform solution and heated to 70° C. for ½ hour. The mixture becomes slightly turbid and a sample of the reaction mixture is completely soluble in water indicating the formation of the quaternary salt. The reaction mass is cooled to room temperature to give a waxy solid. A 20 percent solution of the quaternary salt obtained above is made by dissolving 4.25 g of quaternary salt in 20 g of toluene, and 2 g of sodium styrene sulfonate in a fine powder form is added. The slurry is stirred at room temperature for 16 hours to cause the exchange of the chloride ion of the soluble quaternary salt with the styrene sulfonate anion. A fine precipitate of sodium chloride precipitates as the by-product of this exchange reaction precipitates out and the required product of the ion functional monomer remains in toluene solution. The reaction mixture is allowed to settle and the clear supernatant solution is decanted and evaporated under vacuum to recover the desired ionic monomer. Proton nuclear magnetic resonance analysis ($^1$H) indicates that the ionic monomer is obtained in very good purity. The monomer is soluble in styrene, t-butylstyrene and heptane.

B. Preparation of Ionic Copolymer

To a 250-ml citrate bottle are charged 145.4 g of styrene (1.4 mole), 0.84 g of ionic monomer (1.4 mmole) of Part A, and sufficient solution of 14.8 mg of 2,5-dimethyl-2,5-bis(t-butylperoxy)-hex-3-yne in 0.74 g of toluene to provide a concentration of 100 ppm of the peroxide in the reaction mixture. The resulting polymerization mixture is purged with nitrogen and the bottle is capped to exclude air. The mixture is tumbled in an oil bath heated to 125° C. for 48 hours. The resulting resin is devolatilized at 200° C. under vacuum (0.5 mm Hg) for 4 hours. The resulting solid copolymer is recovered by breaking the bottle and grinding the solid product of the reaction. The copolymer is then devolatilized at 170° C.–200° C. under vacuum to remove residual volatiles. The copolymer is then ground for use in subsequent tests.

Several additional copolymers are made using the same procedure except that the ratio of styrene to ionic monomer is changed as specified in Table I.

C. Preparation of Plasticized Ionic Copolymer

A plasticized ionic copolymer is prepared following the aforementioned procedure of Part B except that 0.92 g of zinc stearate as a plasticizer is added to the polymerization mixture before the mixture is purged with nitrogen. The plasticized copolymer is recovered and ground for subsequent tests as in Part B.

D. Property Evaluation

Solution viscosities of the ionic copolymers made in Part B hereof are determined by dissolving 0.25 g of the copolymer in 10 g of toluene and determining the Brookfield viscosity using a Brookfield LVT viscometer having a #2 spindle operating at 6 rpm and 20° C. The results are reported in Table I.

A 50-g portion of each of the copolymers of Part B is compression molded in a Pasadena Hydraulics compression molder at 200° C. to give smooth transparent films (0.055 in. (0.14 cm) thickness) which are without blemishes or gels. Similar portions of the copolymers of Part B are extruded in a Custom Scientific Instrument mixer-extruder operating at 200° C. to form smooth strands. No change in melt processability is observed as the copolymers having higher solution viscosities are molded or extruded.

Films of the ionic copolymers of Part B are prepared by molding a 50-g portion of each copolymer in a compression molder operating at 200° C. to form a film having an average thickness of ~0.75 mm. The film for each copolymer when heated on a hot plate to 130° C., can be elongated. As ionic mer content of the copolymer increases, the degree of elongation without breaking increases. The films are tested for stress/strain properties and the results are reported in Table I.

The extruded and chopped samples (10 g) of the ionic copolymers from Part B are imbibed with 30 percent fluorocarbon blowing agent based on the film sample and placed in a hot air oven (130° C.) for varying lengths of time. The foaming characteristics are shown in Table I.

TABLE I

| Sample No. | Monomer Ratio Sty/Ionic | Viscosity[1] (cps) | Stress/Strain[2] | Foam[3] % Vol Exp | Time (min) |
|---|---|---|---|---|---|
| 1 | 99.9/0.1 | 31.7 | 10/22 | 113 | 20 |
| 2 | 99.7/0.3 | 105. | 45/40 | 160 | 45 |
| 3 | 99.5/0.5 | 195. | 125/45 | >170 | 60 |
| 4 | 99.3/0.7 | 242.5 | 330/60 | 117 | 40 |
| 5 | 99.1/0.9 | 255. | 450/36 | 130 | 60 |

[1]Brookfield viscosity - 2.5 percent in toluene using a Brookfield LVT viscometer having a #2 spindle operating at 6 rpm and 20° C.
[2]Stress/strain for the copolymers is determined by the following method: Thin (0.03 cm) compression molded samples are prepared at 180° C. and 10,000 psi using a 3-minute preheating time, 2-minute cure time and a 10-minute cooling time. The samples are then punched into a dogbone shape. A test chamber having a nitrogen atmosphere is heated to 130° C. The sample is clamped between a support and load rod and lowered into test chamber for 3 minutes. The load rod is then lowered at a constant rate of 25.4 mm/min. Force is then recorded and extension is determined by clamp separations. Force vs. extension data are determined assuming uniform reduction of the necked down cross-section to plot true stress (kg/cm$^2$) vs. engineering strain ($\Delta L/Lo$).
[3]A 10-g sample of the polymer coated with 2 percent of Ajax Jigger P clay is mixed with an 80/20 mixture of Freon 12/Freon 11 and charged to a glass ampule. The ampule is rotated end to end in an 80° C. water bath for ~16 hours and then cooled in dry ice at -10° C. Vol Exp is volume expansion as a percentage of original volume of copolymer and blowing agent before heating. Increasing volume expansion corresponds to foams having lower densities. Time is the minutes for foam to maintain maximum volume.

The resulting foams exhibit excellent resiliency, flexibility and thermal collapse resistance. The ionic copolymer foams have a fine cell size. The ionic copolymer foams can be collapsed, reimbibed with blowing agent and refoamed to produce foams having properties comparable to original foams. In contrast, foams made from styrene homopolymer are observed to possess very poor foam properties.

EXAMPLE 2

A. Preparation of Didodecyldimethylammonium Styrene Sulfonate

Two grams of didodecyldimethyl quaternary ammonium chloride is dissolved in 25 g of toluene. To the clear solution, 1 g of sodium styrene sulfonate in a fine powdered form is added and stirred at room temperature overnight (16 hours) to complete the ion-exchange reaction. The mixture is then allowed to settle and the clear supernatant toluene solution is decanted and evaporated under vacuum to obtain the desired ionic comonomer. The purity of the monomer is more than 75 percent according to proton nuclear magnetic resonance analysis. The compound is soluble in styrene, t-butylstyrene and toluene.

B. Preparation of Ionic Copolymer

Following the procedure of Example 1, Part B, a copolymer of 51.72 g of styrene and 1.1625 g of the ionic comonomer of Part A of this example is prepared. The copolymer is evaluated as in Example 1 and exhibits properties similar to the copolymer of Example 1.

EXAMPLE 3

A. Preparation of Zinc Dodecyl Maleate

Molar equivalents of dodecanol and maleic anhydride are combined with 60 ml of toluene. The mixture is stirred and heated under nitrogen at 130° C. for 3 hours. The toluene solvent is removed to give a monoalkyl maleate.

To a 12 percent weight by volume (w/v) acetone suspension of the monododecyl maleate heated to 50° C. is added 1.0 molar equivalent sodium hydroxide as a 10 percent w/v aqueous solution. After the stirred suspension clears, 0.5 molar equivalent zinc acetate dihydrate as a saturated aqueous solution is added with stirring. The supernatant liquid is separated from the precipitated zinc dodecyl maleate.

B. Preparation of Zinc Dodecyl Fumarate

To a solution of 284 g of the monododecylmaleate of Part A in 600 ml of carbon tetrachloride heated to 80° C. is added 20 molar milliequivalents (3 g) of azobis-(isobutyronitrile) followed by dropwise addition of 20 molar milliequivalents of bromine as a 1.5 percent w/v carbon tetrachloride solution (200 ml) over one-half hour. After an additional one-half hour of heating, the supernatant liquid is separated from the precipitated monododecyl fumarate.

To a 12 percent w/v acetone suspension of the monododecyl fumarate heated to 50° C. is added 1.0 molar equivalent sodium hydroxide (299 g) as a 10 percent w/v aqueous solution. After the stirred suspension clears, 0.5 molar equivalent zinc acetate dihydrate (110 g) as a saturated aqueous solution is added with stirring. The supernatant liquid is separated from the precipitated zinc dodecyl fumarate.

C. Preparation of Ionic Copolymer

Following the procedure of Part B of Example 1, 199.39 g of styrene and 0.61 g of zinc dodecyl fumarate are heated at 130° C. for 48 hours in the presence of 300 ppm of the peroxygen compound used in Part B of Example 1. The resulting copolymer is recovered and tested for Brookfield viscosity and for melt tension and the results are reported in Table II. Following the same procedure, a copolymer is prepared which is similar except that the concentration of zinc dodecyl fumarate is doubled. This copolymer is similarly recovered and tested, and the results are reported in Table II.

TABLE II

| Sample No. | Monomer Ratio[1] Sty/ZDF | Solution Viscosity[2] (cps) | Stress/-Strain[3] |
|---|---|---|---|
| 1 | 99.95/0.05 | 43 | 10 |
| 2 | 99.9/0.1 | 400 | 35 |

[1]Sty-styrene, ZDF-zinc dodecyl fumarate
[2]Brookfield LVT viscometer using #2 spindle operating at 6 rpm and 20° C. and 10 percent copolymer in toluene.
[3]See footnote 2, Table I.

As evidenced by the data of Table II, the solution viscosity and melt tension are significantly increased by an increase of the ionic comonomer.

EXAMPLE 4

A. Preparation of

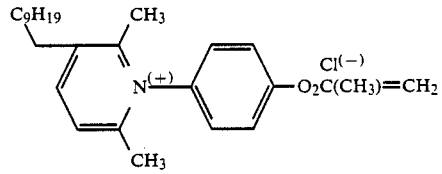

To a mole equivalent (530 g) of 1-dodecene dissolved in 7.6 molar equivalents (1500 g) acetic anhydride is added dropwise 1.1 molar equivalents concentrated sulfuric acid (333 g). The solution is stirred and heated to 85° C. for 16 hours. The contents are then poured into 600 ml of methylene chloride. The methylene chloride solution is then shaken with an equal volume (600 ml) of saturated salt solution. Separation and removal of the methylene chloride solvent gives an oil of pyrylium salt.

To a 15 percent w/v methanol solution of pyrylium salt is added an equimolar amount (100 g) of p-aminophenol and reacted for 3 hours. An equal volume (2500 ml) of water is combined and the solution filtered to remove any insoluble oil. To the filtrate is added 25 molar equivalents (1.5 liters) anion-exchange resin (OH form) such as sold by The Dow Chemical Company under the tradename DOWEX® SBR (OH). The solution is stirred for 1 hour followed by separation of the supernatant liquid and the methanol/water removed to give a solid alkylpyridinium zwitterion.

To a 40 percent w/v methylene chloride solution of alkylpyridinium zwitterion is added dropwise 1.05 molar equivalents (73.2 g) of methacryloyl chloride. Removal of methylene chloride gave an oil of 1-(p-methacryloxyphenyl)-2,6-dimethyl-3-nonylpyridinium chloride.

B. Preparation of 1-(p-methacryloxyphenyl)-2,6-dimethyl-3-Nonyl-pyridinium Styrene Sulfonate (4B)

To a 20 percent w/v 1,2-dichloroethane solution of 1-(p-methacryloxyphenyl)-2,6-dimethyl-3-nonyl-pyridinium chloride is added 150 g of sodium p-styrene sulfonate. The slurry is heated to 45° C. and stirred for 4 hours. The solids are separated from the supernatant liquid and the 1,2-dichloroethane is removed to give an oil of 1-(p-methacryloxyphenyl)-2,6-dimethyl-3-nonyl-pyridinium p-styrene sulfonate.

C. Copolymerization of Styrene with 4B

A 0.81-g (1.4 mmole) portion of 4B is dissolved in 145.4 g (1.4 moles) of styrene using mild agitation without heating. To this solution in a 325-ml glass bottle is added 33 g of a 2 percent solution of the peroxide used in Part B of Example 1 in toluene. The bottle is sealed, placed in an ethylene glycol bath equipped with a tumbler and heated to 130° C. for 48 hours. The resulting solid copolymer is then cooled to room temperature and recovered from the glass bottle. The recovered copolymer is ground to a coarse powder. This copolymer is a styrene/4B (99.5/0.5) copolymer having a weight average molecular weight of 300,000–400,000 as determined by size exclusion chromatography. Following a similar procedure, a copolymer is prepared which is similar except that the concentration of 4B is doubled.

D. Physical Property Evaluation

The resulting copolymers of Part C are tested for Brookfield viscosity and for melt tension (Stress/Strain) and the results are reported in Table III.

TABLE III

| Sample No. | Monomer ratio[1] Sty/4B | Solution Viscosity[2] (cps) | Stress/Strain[3] |
|---|---|---|---|
| 1 | 99.9/0.1 | 11.5 | 72/29 |
| 2 | 99.8/0.2 | 25.3 | 155/break at 20 |

[1]Sty - styrene, 4B - as defined in Part B of this example.
[2]Brookfield LVT viscometer using #2 spindle operating at 6 rpm and 20° C. and 2.5 percent copolymer in toluene.
[3]See footnote 2, Table I.

EXAMPLE 5

A. Preparation of

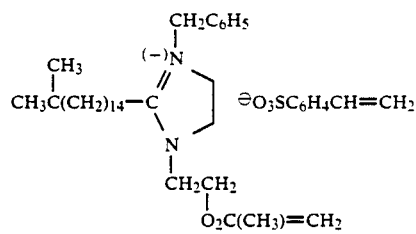

1-(2-methacryloxyethyl)-2-isostearyl-3-benzylimidazolinium Styrene Sulfonate (5A)

To a 10 percent w/v ethylbenzene solution of 135 g of 1-(2-hydroxyethyl)-2-isostearyl-3-benzylimidazolinium chloride at 20° C. is added 1.1 molar equivalents (24.5 g) of pyridine followed by dropwise addition of 1.3 molar equivalents (38.3 g) of methacryloyl chloride. The solution is stirred for 4 hours at 20° C. followed by separation of the supernatant liquid and the ethylbenzene removed to give an oil of 1-(2-methacryloxyethyl)-2-isostearyl-3-benzylimidazolinium chloride.

To a solution of 154 g of 1-(2-methacryloxyethyl)-2-isostearyl-3-benzylimidazolinium chloride in 900 ml of methylene chloride is added 1.3 molar equivalents (75.6 g) of sodium p-styrene sulfonate. The slurry is heated to 45° C. and stirred for 4 hours. The solids are separated from the supernatant liquid and the methylene chloride is removed to give an oil of 1-(2-methacryloxyethyl)-2-isostearyl-3-benzylimidazolinium p-styrene sulfonate, (5A).

B. Copolymerization of Styrene and 5A

Following the procedure of Part B of Example 4, a 4-g portion of 5A is dissolved in 200 g of styrene. To this solution is added 3 g of a 2 percent solution of the peroxide used in part B of Example I in toluene. The resulting copolymer is tested for properties as reported in Table IV. In addition, several other copolymers are similarly prepared using varying amounts of 5A. These copolymers are also tested and the results are reported in Table IV.

TABLE IV

| Sample No. | Monomer Ratio[1] Sty/5A | Solution Viscosity[2] (cps) | Stress/Strain[3] |
|---|---|---|---|
| 1 | 99.9/0.1 | 7.7 | 96/24 |
| 2 | 99.8/0.2 | 14.1 | 66/27 |
| 3 | 99.7/0.3 | 25.9 | 162/32 |
| 4 | 99.5/0.5 | 29.8 | 123/37 |

[1]Sty - styrene 5A - 1-(methacryloxyethyl)-2-isostearyl-3-benzylimidazolinium styrene sulfonate
[2]Brookfield LVT viscometer using a #2 spindle operating at 6 rpm and 20° C. in a 2.5 percent solution of polymer in toluene.
[3]See footnote 2, Table I.

As evidenced by the data in Table IV, the presence of increasing amounts of the ionic comonomer (5A) significantly increases the solution viscosity and melt tension of such copolymers.

EXAMPLE 6

A. Preparation of Zinc 2-Ethylhexyl Itaconate (6A)

To a molar equivalent (260 g) of 2-ethylhexyl alcohol and itaconic acid (260 g) combined with 80 ml of toluene is added 3 molar milliequivalents (1 g) of p-toluenesulfonic acid monohydrate and 100 molar microequivalents (0.03 g) of hydroquinone. The mixture is stirred and heated at 130° C. until a molar equivalent of water is removed. The toluene is removed to give a solid of mono-2-ethylhexyl itaconate.

To a 30 percent w/v aqueous dispersion of the mono-2-ethylhexyl itaconate is added 1 molar equivalent of sodium hydroxide as a 10 percent w/v aqueous solution (800 ml). After the stirred suspension clears, 0.5 molar equivalent (219 g) of zinc acetate dihydrate as a saturated aqueous solution is added with stirring. The supernatant liquid is separated from the precipitated zinc 2-ethylhexyl itaconate (6A).

B. Preparation and Evaluation of Butyl Acrylate/6A Copolymer

Following the procedure of Part B of Example 1, 44.2 g of butyl acrylate, 5.8 g of 6A and 6.7 g of zinc stearate in 60 ml of toluene are heated in a sealed vessel at 80° C. for 16 hours in the presence of 500 ppm of azobis-(isobutyronitrile). The resulting copolymer is recovered and tested for solution viscosity and melt tension and the results are reported in Table V. Other copolymers are prepared using different monomer ratios and concentrations of zinc stearate and similarly tested. The results are also reported in Table V.

TABLE V

| Sample No. | Monomer Ratio[1] BA/6A | Zn Stearate[2] (6A/ZnST) | Instron[3] Stress (psi) | Strain (ΔL/L) |
|---|---|---|---|---|
| 1 | 97/3 | 1:1 | 1030 | 525 |
| 2 | 97/3 | 1:3 | 1685 | 368 |
| 3 | 95/5 | 1:1 | 2300 | 510 |
| 4 | 95/5 | 1:2 | 2550 | 570 |
| 5 | 95/5 | 1:3 | 2300 | 320 |

[1]Mole ratio of monomers wherein BA represents butyl acrylate and 6A is zinc 2-ethylhexyl itaconate.
[2]Zinc stearate in percent based on moles of 6A present.
[3]20° C., Draw Rate = 1.0 cm/sec; samples 0.7 mm thick by 1 cm length.

As evidenced by the foregoing data the copolymers of the present invention behave like a thermoplastic elastomer which can be extruded and molded at higher temperature and at ambient temperatures behave like elastomers. It is also evidenced that the copolymer elastomers can be made in a single step incorporating the ionic plasticizer in situ during the formation of the ionic copolymer.

What is claimed is:

1. An ionic copolymer of at least one nonionic ethylenically unsaturated, water insoluble monomer and at least one ionic ethylenically unsaturated amphiphilic monomer, said ionic monomer being selected from the group consisting of 1-(p-methacryloxyphenyl)-2,6-dimethyl-3-nonylpyridinium p-styrene sulfonate, didodecyldimethylammonium p-styrene sulfonate, vinylbenzyl(dimethyl) (octadecyl)ammonium p-styrene sulfonate, zinc dodecyl maleate, zinc dodecyl fumarate, 1-(2-methacryloxyethyl)-2-isostearyl-3-benzylimidazolinium styrene sulfonate, and zinc 2-ethylhexyl itaconate and being present in an amount sufficient to provide an increase in tensile strength of the polymer at temperatures above the glass transition temperature of the polymer said copolymer having (1) an essentially uniform distribution of an ionic amphiphilic monomer in the molecules of the copolymer and (2) a number average molecular weight greater than 250.

2. The ionic copolymer of claim 1 wherein the nonionic monomer is an α-olefin, vinyl aromatic monomer, an alkyl or aryl ester of an α,β-ethylenically unsaturated carboxylic acid, a diene, and unsaturated ester of a saturated carboxylic acid.

3. The ionic copolymer of claim 1 which exhibits a uniform, gel-free solution viscosity and a controllable melt viscosity and hot melt tension.

4. The polymer of claim 1 which comprises from about 50 to about 99.9 mole percent of the nonionic monomer(s) and from about 0.05 to about 50 mole percent of the ionic monomer(s).

5. The polymer of claim 1 which comprises from about 90 to about 99.9 mole percent of the nonionic monomer(s) and from about 0.1 to about 10 mole percent of the ionic monomer(s).

6. The polymer of claim 1 which comprises from about 95 to about 99.9 mole percent of the nonionic monomer(s) and from about 0.1 to about 5 mole percent of the ionic monomer(s).

7. The polymer of claim 1 wherein the nonionic monomer is styrene and the ionic monomer is vinylbenzyl 1-(2-methacryloxyethyl)-2-isostearyl-3-benzylimidazolinium styrene sulfonate.

8. The polymer of claim 1 wherein the nonionic monomer is styrene and the ionic monomer is 1-(p-methacryloxyphenyl)-2,6-dimethyl-3-nonylpyridinium p-styrene sulfonate.

9. The polymer of claim 1 wherein the nonionic monomer is styrene and the ionic monomer is zinc dodecylmaleate or zinc dodecyl fumarate.

10. The polymer of claim 1 wherein the nonionic monomer is styrene and the ionic monomer is 1-(p-methacryloxyphenyl)-2,6-dimethyl-3-nonylpyridinium chloride, 1-(p-methacryloxyphenyl)-2,6-dimethyl-3-nonyl-pyridinium styrene sulfonate or 1-(2-methacryloxyethyl)-2-isostearyl-3-benzylimidazolinium styrene sulfonate.

11. The polymer of claim 5 wherein the nonionic monomer is butyl acrylate and the ionic monomer is 2-ethylhexyl itaconate.

* * * * *